United States Patent
Kodera et al.

(10) Patent No.: US 7,314,380 B2
(45) Date of Patent: Jan. 1, 2008

(54) CARD CONNECTOR IN WHICH A BRAKING FORCE IS VARIED DURING A CARD EJECTING PROCESS

(75) Inventors: Masafumi Kodera, Tokyo (JP); Joe Motojima, Tokyo (JP); Akira Natori, Tokyo (JP); Keiichiro Suzuki, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 46 days.

(21) Appl. No.: 11/083,734

(22) Filed: Mar. 18, 2005

(65) Prior Publication Data

US 2005/0208805 A1    Sep. 22, 2005

(30) Foreign Application Priority Data

Mar. 19, 2004    (JP) ............................. 2004-080065

(51) Int. Cl.
  *H01R 13/62*    (2006.01)
(52) U.S. Cl. ...................................... 439/159
(58) Field of Classification Search ................ 439/159; 235/441
  See application file for complete search history.

(56) References Cited

U.S. PATENT DOCUMENTS

| | | | |
|---|---|---|---|
| 5,703,346 A * | 12/1997 | Bricaud et al. ............. | 235/441 |
| 6,105,868 A * | 8/2000 | Reichardt .................... | 235/441 |
| 6,315,583 B1 | 11/2001 | Nishioka | |
| 6,905,369 B2 * | 6/2005 | Nakai et al. ................ | 439/630 |
| 6,908,322 B1 * | 6/2005 | Bricaud et al. ............. | 439/159 |
| 2003/0151901 A1 | 8/2003 | Nogami | |
| 2005/0208804 A1 * | 9/2005 | Kikuchi et al. ............. | 439/159 |
| 2006/0116013 A1 * | 6/2006 | Ooya et al. ................. | 439/159 |

FOREIGN PATENT DOCUMENTS

| | | |
|---|---|---|
| CN | 2501207 Y | 7/2002 |
| JP | 1-60377 U | 4/1989 |
| JP | 2001-52812 A | 2/2001 |
| JP | 2001052812 A * | 2/2001 |

* cited by examiner

*Primary Examiner*—Briggitte R. Hammond
(74) *Attorney, Agent, or Firm*—Frishauf, Holtz, Goodman & Chick, P.C.

(57) ABSTRACT

In a card connector including a fixed portion adapted to receive a card, a conductive contact is coupled to the fixed portion and adapted to be connected to the card received in the fixed portion. An eject mechanism is coupled to the fixed portion and adapted to eject the card from the fixed portion in an ejecting direction. A braking mechanism is coupled to the eject mechanism and adapted to supply a controlled braking force to the eject mechanism. The controlled braking force is variable in an ejecting process of the card.

12 Claims, 8 Drawing Sheets

CARD CONNECTOR IN WHICH A BRAKING FORCE IS VARIED DURING A CARD EJECTING PROCESS

This application claims priority to prior Japanese Patent Application JP 2004-80065, the disclosure of which is incorporated herein by reference.

BACKGROUND OF THE INVENTION

This invention relates to a card connector having an eject mechanism for ejecting a card.

There is known a card connector having an eject mechanism for ejecting a card by means of a restoring force obtained by deforming an elastic member. The eject mechanism is disadvantageous in that, if the restoring force of the elastic member is excessively strong, the card may jump out from the connector depending upon the manner of operation.

In order to prevent the card from jumping out, it is proposed to provide a brake for exerting a frictional force upon the card (see Japanese Unexamined Patent Application Publication No. 2001-52812). The frictional force as a braking force has a preselected fixed value throughout an ejecting process of the card.

However, it is difficult to make the brake exert an appropriate braking force during the ejecting process. For example, if the braking force is excessively large, the card may not sufficiently be ejected. On the contrary, if the braking force is excessively small, the card may jump out from the connector.

SUMMARY OF THE INVENTION

It is therefore an object of this invention to provide a card connector which is capable of appropriately performing a card ejecting operation.

It is another object of this invention to provide a card connector in which a card ejecting operation is controlled by effective braking.

Other objects of the present invention will become clear as the description proceeds.

According to an aspect of the present invention, there is provided a card connector which comprises a fixed portion adapted to receive a card, a conductive contact coupled to the fixed portion and adapted to be connected to the card, an eject mechanism coupled to the fixed portion and adapted to eject the card from the fixed portion in an ejecting direction, and a braking mechanism coupled to the eject mechanism and adapted to supply a controlled braking force to the eject mechanism, the controlled braking force being variable in an ejecting process of the card.

DESCRIPTION OF THE PREFERRED EMBODIMENTS

Figure 1:
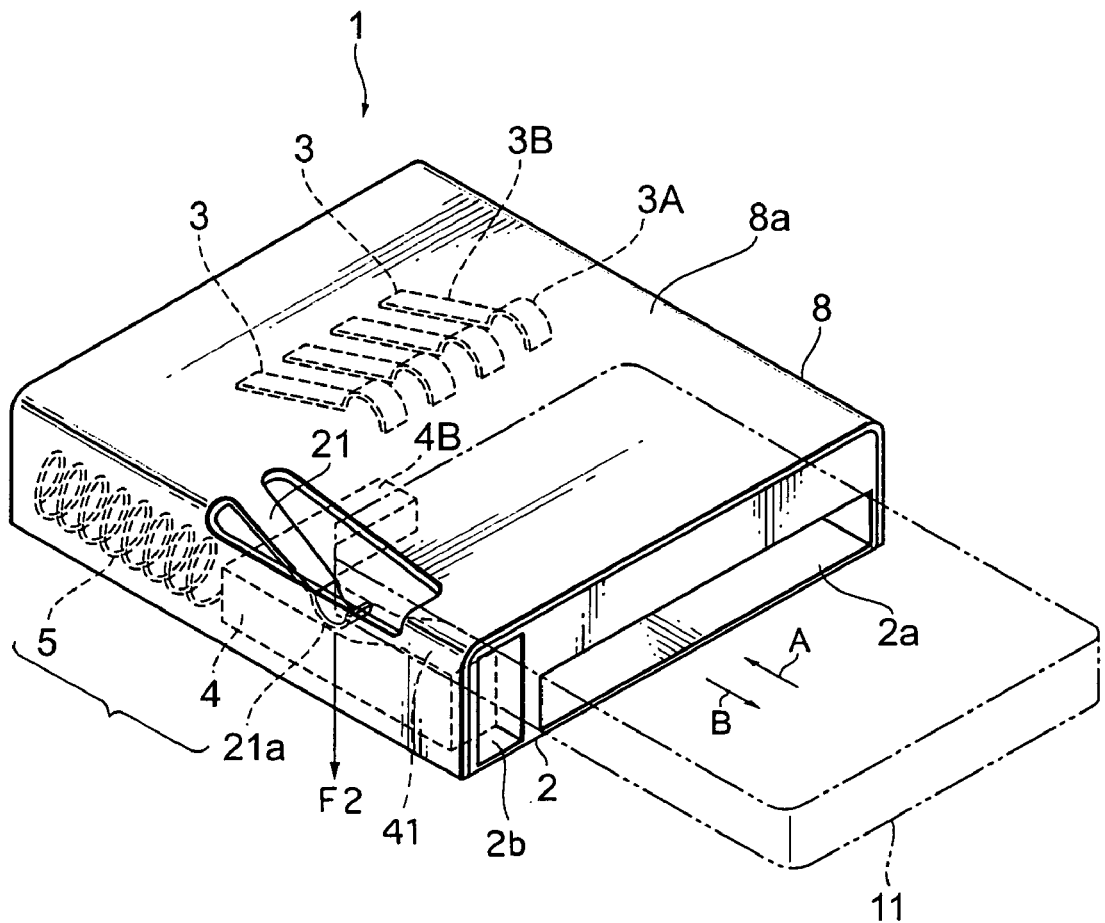
FIG. 1 is a perspective view of a card connector according to a first embodiment of this invention when a card is not fitted.

At first referring to FIGS. 1 through 3, description will be made of a card connector according to a first embodiment of this invention.

The card connector depicted at 1 in the figures is for use in connecting a card 11. The card connector 1 (may simply be called the connector 1) comprises an insulator 2, a plurality of conductive contacts 3 held by the insulator 2, an eject mechanism 10, and a metal cover member 8 fitted and fixed to the insulator 2 to cover a principal surface of the insulator 2. A combination of the insulator 2 and the cover member 8 will be referred to as a fixed portion.

The insulator 2 has a receiving portion 2a opened at its front side to receive the card 11. The card 11 is inserted into the receiving portion 2a in an inserting direction A. In an inner part of the receiving portion 2a, the contacts 3 are arranged along the principal surface of the insulator 2. Each contact 3 has a contacting portion 3A and a flat contacting portion 3B formed at its one end and the other end, respectively. The contacting portion 3A is brought into contact with a corresponding contacting portion (not shown) of the card 11 when the card 11 is inserted into the receiving portion 2a.

The eject mechanism 10 serves to eject the card 11 in an ejecting direction B opposite to the inserting direction A. The eject mechanism 10 comprises a slider member 4 movable in the inserting and the ejecting directions A and B together with the card 11, and an elastic member 5 urging the slider member 4 in the ejecting direction B.

Figure 3:
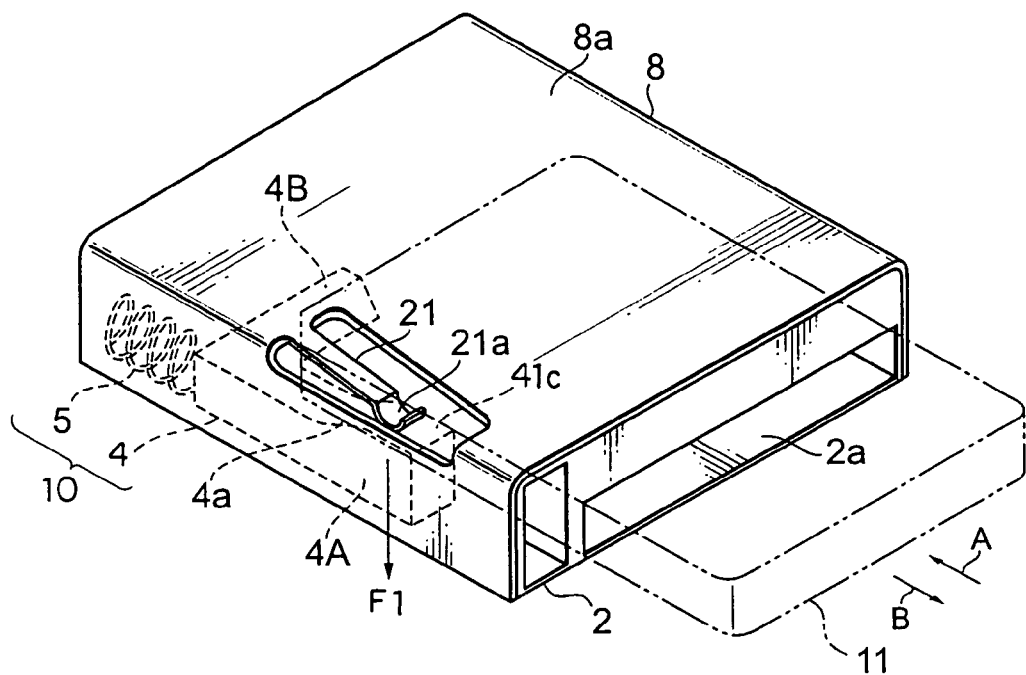
FIG. 3 is a perspective view of the card connector in FIG. 1 when the card is fitted.

The slider member 4 is slidable between a position illustrated in FIG. 3, i.e., a first position where the card 11 is connected to the contacts 3 and a position illustrated in FIG. 1, i.e., a second position where the card 11 is disconnected from the contacts 3. The slider member 4 comprises a slider portion 4A extending on a lateral side of the insulator 2 in the inserting and the ejecting directions A and B, and a card contacting portion 4B connected to one end of the slider portion 4A in the inserting direction A and extending in a direction perpendicular to the inserting direction A. The slider portion 4A is received in a slider receiving hole 2b formed in the insulator 2. The slider receiving hole 2b extends in the inserting and the ejecting directions A and B. The card contacting portion 4B is brought into contact with a forward end surface of the card 11 in the inserting direction A.

For example, the elastic member 5 comprises a coil spring. In this case, the coil spring is interposed between the insulator 2 or the cover member 8 and the slider member 4A.

The cover member 8 is provided with a pressing member 21 in the form of a leaf spring. The pressing member 21 is integrally formed with the cover member 8 and has one end kept in contact with the slider member 4. Specifically, the pressing member 21 is formed by punching a part of the cover member 8 and has a cantilevered structure with a free end 21a elastically contacted with the slider portion 4A.

The slider portion 4A has a cam surface 41. The cam surface 41 is designed so that a contacting force of the pressing member 21 applied upon the slider portion 4A when the slider member 4 is located at the first position is greater than that when the slider member 4 is located at the second position. Specifically, the cam surface 41 has a first or lower surface 41a relatively near to the elastic member 5, a second or higher surface 41b relatively far from the elastic member 5, and an inclined surface 41c connecting the lower and the higher surfaces 41a and 41b. In other words, the lower and the higher surfaces 41a and 41b are different in height from each other with the inclined surface 41c interposed therebetween.

When the slider member 4 is located at the first position, the pressing member 21 is brought into contact with the higher surface 41b to produce a relatively large pressing force F1. When the slider member 4 is located at the second position, the pressing member 21 is brought into contact with the lower surface 41a to produce a relatively small pressing force F2. Based on each of the relatively larger pressing force F1 and the relatively small pressing force F2, a frictional force is produced between the slider member 4 and each of the free end 21a of the pressing member 21 and an inner wall surface of the slider receiving hole 2b of the insulator 2.

When the slider member 4 is located at the second position, the frictional force is small as compared with the time when slider member 4 is located at the first position. Thus, upon ejecting the card 11, the card 11 is applied with a strong braking force at an initial stage of ejection in which a restoring force of the elastic member 5 is great. On the other hand, at a last stage of ejection in which the restoring force of the elastic member 5 is small, the braking force applied to the card 11 is weakened. Therefore, the card 11 is prevented from jumping out from the connector 1 and from failing to be ejected from the connector 1. A combination of the pressing member 21 and the cam surface 41 serves as a braking mechanism for supplying the eject mechanism 10 with a controlled braking force variable during an ejecting process of the card 11.

Since the pressing member 21 is not brought into direct contact with the card 11, the card 11 is not damaged by the pressing member 21.

Figure 4:
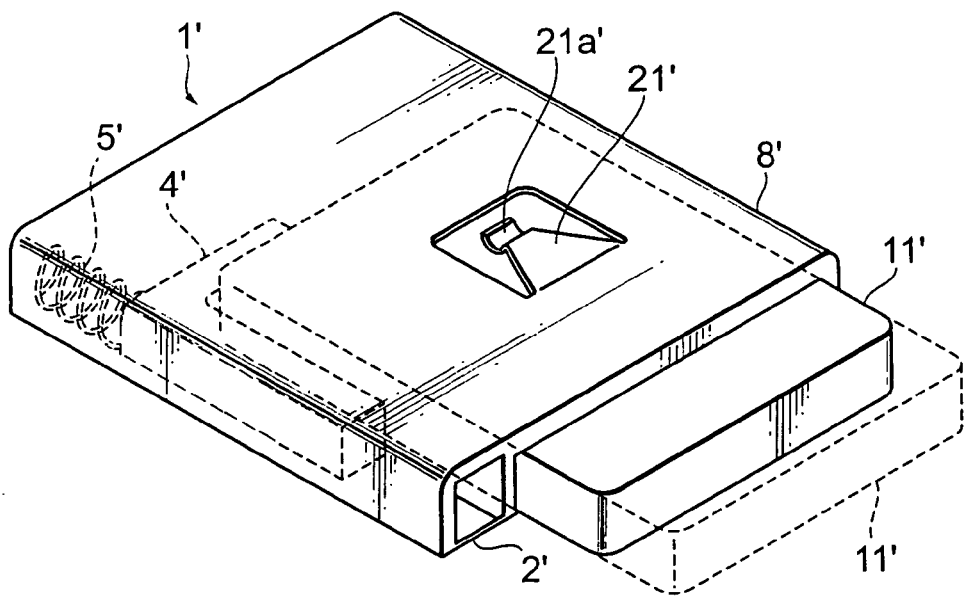
FIG. 4 is a perspective view of a comparative card connector for comparison with the card connector in FIG. 1.

For the purpose of comparison, a connector 1' having a slider member 4' without the cam portion 4 will be described with reference to FIG. 4. The connector 1' illustrated in FIG. 4 comprises an insulator 2' provided with the slider member 4', and a cover member 8' provided with a pressing member 21' formed at a center portion thereof. The pressing member 21' has a free end 21a' brought into direct contact with a card 11'. An elastic member 5' is disposed between the insulator 2' or the cover member 8' and the slider member 4'.

Figure 5:
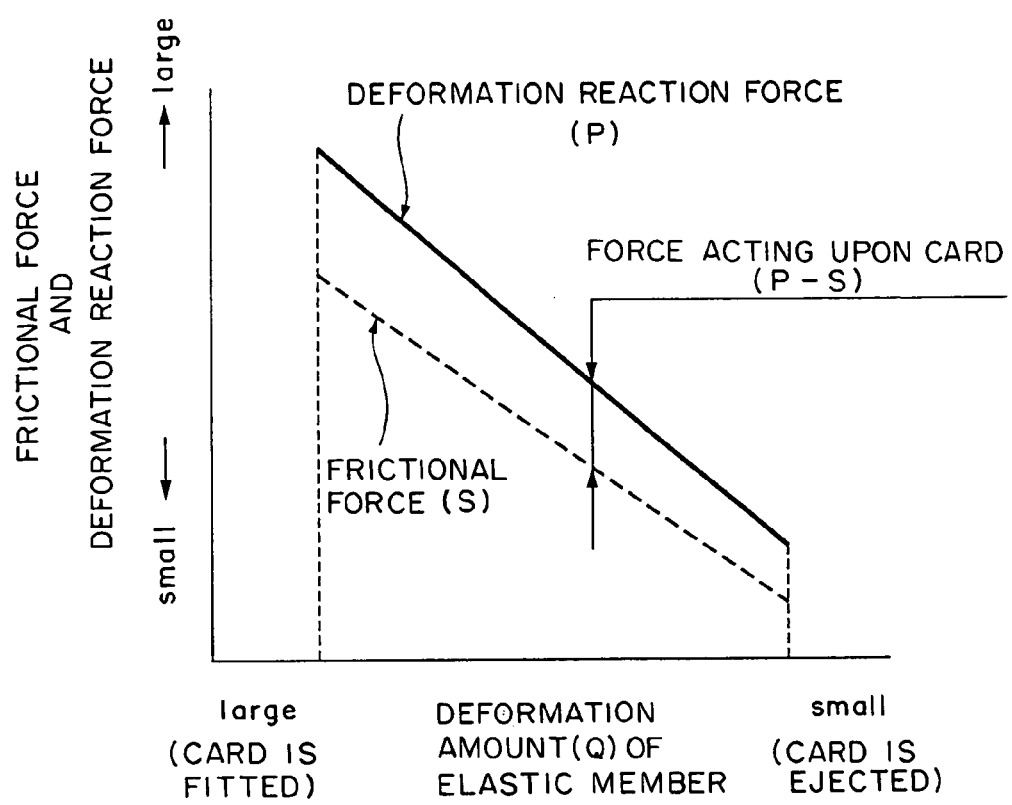
FIG. 5 is a graph showing the relationship between a frictional force as a braking force and a deformation amount of an elastic member in the card connector illustrated in FIG. 1.
Figure 6:
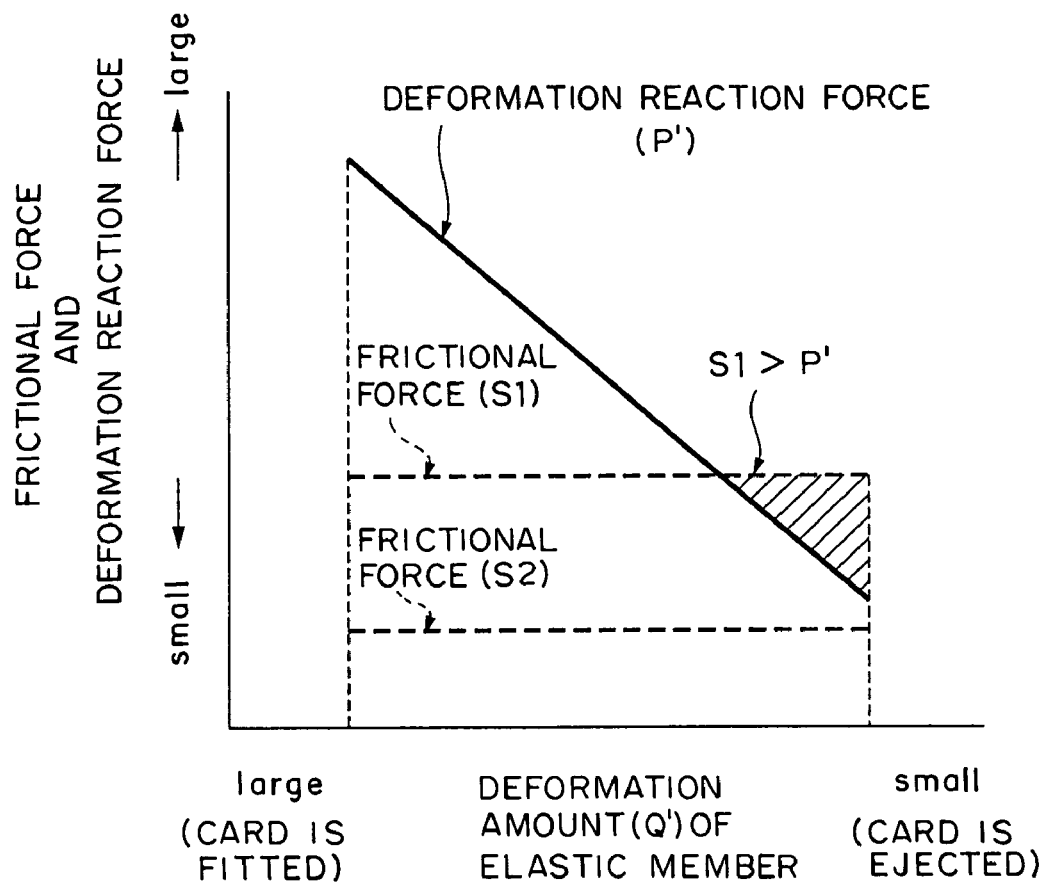
FIG. 6 is a graph similar to FIG. 5 but in the comparative card connector illustrated in FIG. 4.

Referring to FIGS. 5 and 6, description will be made of a difference between the connector 1 illustrated in FIG. 1 and the connector 1' illustrated in FIG. 4 with respect to the relationship between a deformation reaction force P of each of the elastic members 5 and 5' and a frictional force S as a braking force.

As illustrated in FIG. 5, a deformation amount Q of the elastic member 5 and the deformation reaction force P is proportional to each other. The cam portion 4 in the connector 1 illustrated in FIG. 1 is designed so that the frictional force S is great when the deformation reaction force P of the card 11 is great and that the frictional force S is small when the deformation reaction force P is small. Thus, the frictional force S is variable in the connector 1 illustrated in FIG. 1. With the above-mentioned design, it is possible to apply a generally constant ejecting force to the card 11 throughout the ejecting process of the card 11. It is noted here that the ejecting force is equal to a difference obtained by subtracting the frictional force S from the deformation reaction force P.

Referring to FIG. 6, a deformation amount Q' of the elastic member 5' and a deformation reaction force P' is proportional to each other like in FIG. 5. However, a frictional force applied upon the card 11' is constant. Consideration will be made about a greater frictional force S1 and a smaller frictional force S2. In case of the frictional force S1, the frictional force S1 effectively acts as a braking force when the deformation amount Q' is large. However, when the deformation amount Q' is small, the deformation reaction force P' is smaller than the frictional force S1 so that the card 11 is not ejected. In case of the frictional force S2, the card 11' is ejected but the frictional force S2 does not substantially act as a braking force.

Next referring to FIGS. 7 to 10, description will be made of a card connector according to a second embodiment of this invention.

The card connector depicted at 41 in the figures is also used to connect a card 45. The card connector 41 (may simply be called the connector 41) comprises an insulator 42, a plurality of conductive contacts 43 held by the insulator 42, an eject mechanism 50, and a metal cover member 48 fitted and fixed to the insulator 42 to cover a principal surface of the insulator 42. A combination of the insulator 42 and the cover member 48 will be referred to as a fixed portion. The card 45 is inserted into the connector 41 in an inserting direction A to be connected to the contacts 43.

The eject mechanism 50 serves to eject the card 45 in an ejecting direction B opposite to the inserting direction A. The eject mechanism 50 comprises a slider member 44 movable in the inserting and the ejecting directions A and B together with the card 45, and an elastic member 46 urging the slider member 44 in the ejecting direction B.

Figure 9:
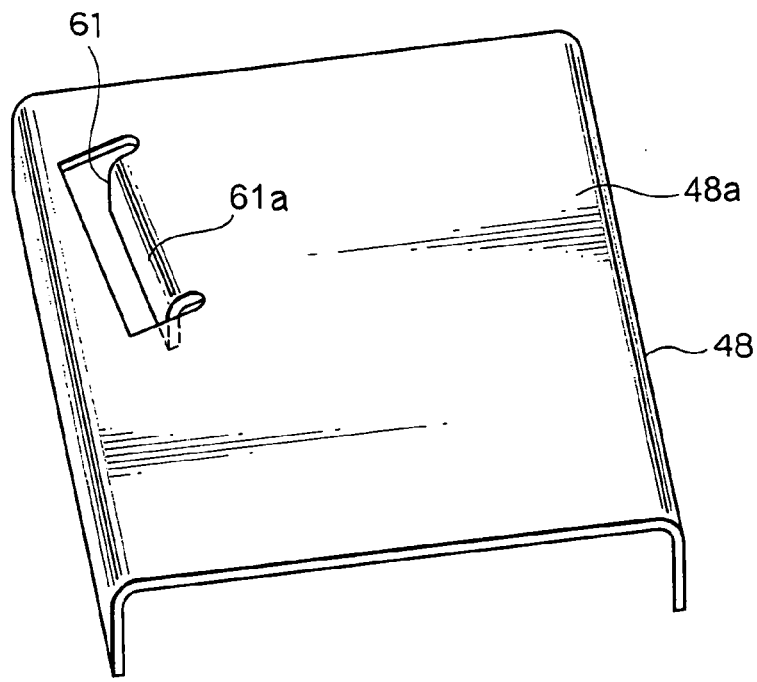
FIG. 9 is a perspective view of a cover member of the card connector illustrated in FIG. 7.
Figure 10:
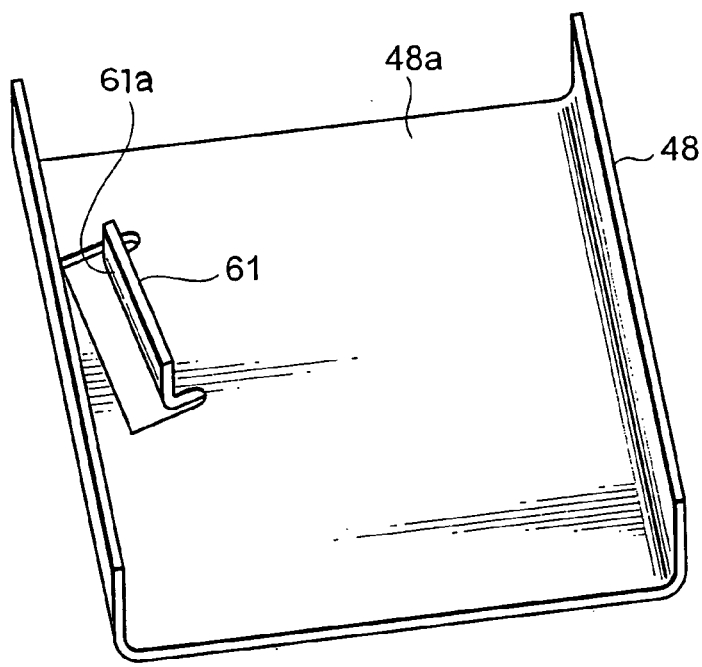
FIG. 10 is a rear perspective view of the cover member illustrated in FIG. 9.

The slider member 44 is provided with a pressing member 51 in the form of a leaf spring fixed thereto. On the other hand, the cover member 48 is provided with a cam portion 61 faced to the pressing member 51. As illustrated in FIGS. 9 and 10, the cam portion 61 is formed by cutting a part a top plate portion 48a of the cover member 48 and bending that part inward. The cam portion 61 is nearer to a slider portion 44A (which will later be described) towards the inserting direction A and is farther from the slider portion 44A towards the ejecting direction B. Thus, the cam portion 61 has a cam surface 61a inclined with respect to the inserting and the ejecting directions A and B.

Figure 7:
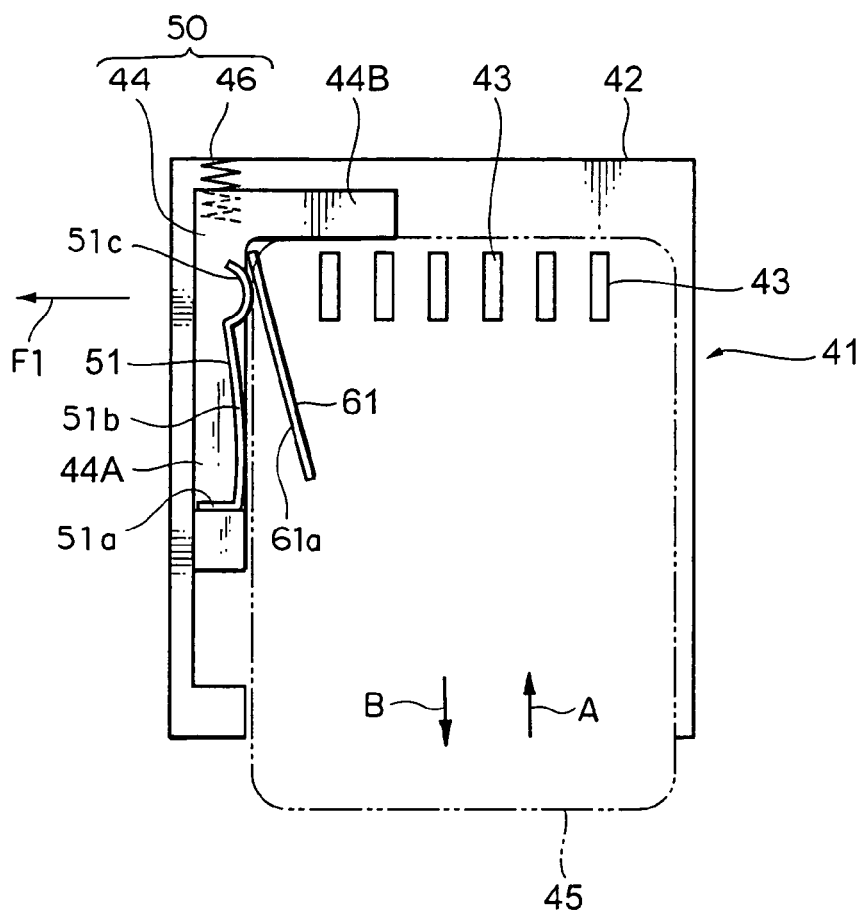
FIG. 7 is a schematic plan view of a card connector according to a second embodiment of this invention when a card is fitted.
Figure 8:
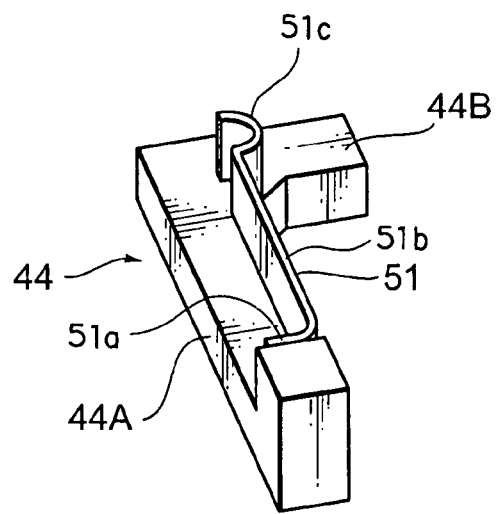
FIG. 8 is a perspective view of a slider member of the card connector illustrated in FIG. 7.
Figure 11:
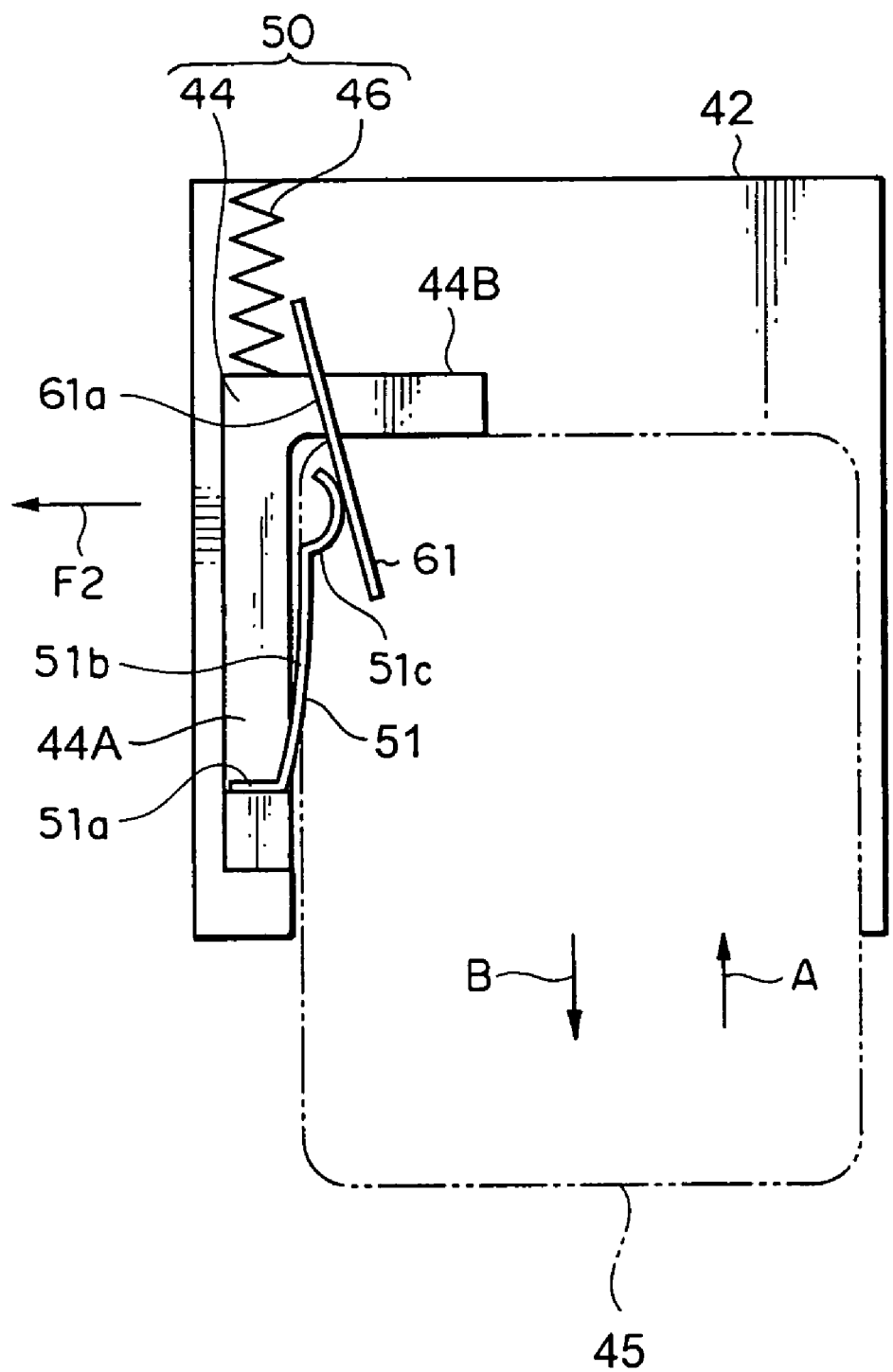
FIG. 11 is a schematic plan view of the card connector illustrated in FIG. 7 when the card is ejected.

The slider member 44 is slidable between a first position where the card 45 is connected to the contacts 43 as illustrated in FIG. 7 and a second position where the card 45 is ejected as illustrated in FIG. 11. The slider member 44 comprises the slider portion 44A extending in the inserting and the ejecting directions A and B, and a card contacting portion 44B connected to one end of the slider portion 44A in the inserting direction A and extending in a direction perpendicular to the inserting direction A.

The pressing member 51 has a fixed end 51a fixed to the slider member 44, a leaf spring portion 51b extending from the fixed end 51 in the inserting direction A, and a free end 51c having a curved shape and formed at an extending end of the leaf spring portion 51b. The free end 51c is brought into elastic contact with the cam portion 61. As described above, the cam portion 61 is inclined. Therefore, a contacting force produced between the free end 51c and the cam portion 61 when the slider member 44 is located at the first position is greater than that when the slider member 44 is located at the second position.

The cam portion 61 is pressed by the pressing member 51 to produce a relatively large pressing force F1 at the first position illustrated in FIG. 7 and a relatively small pressing force F2 at the second position illustrated in FIG. 11. Based on each of the relatively larger pressing force F1 and the relatively small pressing force F2, a frictional force is produced between the slider member 44 and the insulator 42 and between the free end 51c of the pressing member 51 and the cam surface 61a of the cam member 61.

When the slider member 44 is located at the second position, the frictional force is small as compared with the time when the slider member 44 is located at the first position. Thus, upon ejection of the card 45, the card 45 is applied with a strong braking force at an initial stage of ejection in which a restoring force of the elastic member 46 is great. On the other hand, at a last stage of ejection in which the restoring force of the elastic member 46 is small, the braking force applied to the card 45 is weakened. Therefore, the card 45 is prevented from jumping out from the connector 41 and from failing to be ejected from the connector 41. A combination of the pressing member 51 and the cam portion 61 serves as a braking mechanism for supplying the eject mechanism 50 with a controlled braking force variable during the ejecting process of the card 45.

Since the pressing member 51 is not brought into direct contact with the card 45, the pressing member 51 does not damage the card 45.

Figure 12:
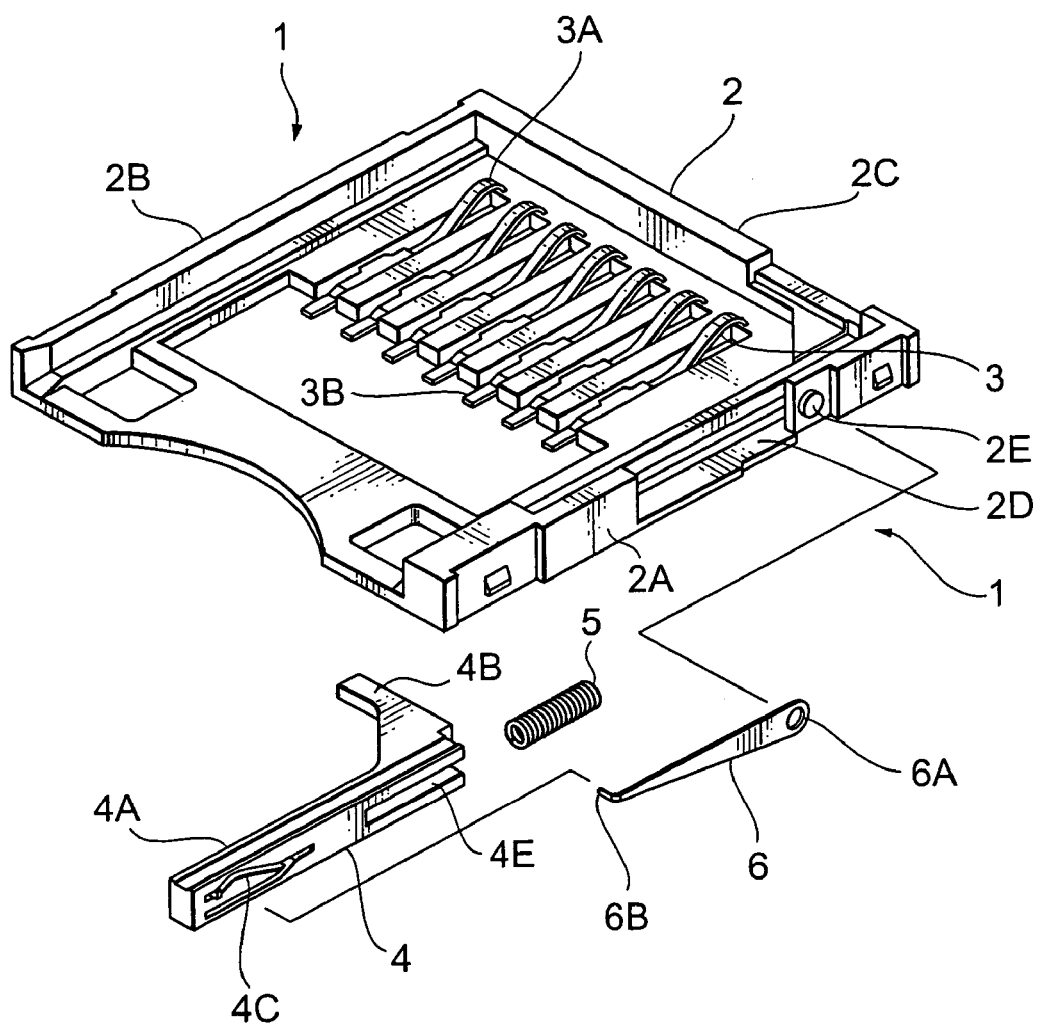
FIG. 12 is an exploded perspective view of a part of a card connector according to a third embodiment of this invention.

Referring to FIG. 12, description will be made of a card connector according to a third embodiment of this invention.

The connector depicted at 1 in FIG. 12 comprises an insulator 2, a plurality of contacts 3 fixed to the insulator 2, and an eject mechanism. In the connector 1, the eject mechanism has a slider member 4 attached to a frame portion 2A of the insulator 2, an elastic member 5 continuously urging the slider member 4 in an ejecting direction, and a cam follower 6 guided by a heart cam 4C formed on the slider member 4.

A card 11 (see FIG. 3) is inserted into the connector 1 and ejected from the connector 1. The insulator 2 comprises frame portions 2A, 2B, and 2C. Each of the contacts 3 has a contacting portion 3A formed at its one end and a flat contacting portion 3B formed at the other end. The slider member 4 has a slider portion 4A and a card contacting portion 4B.

The slider portion 4A is provided with the heart cam 4C formed on its one surface. A forward end of the card 11 is brought into contact with the card contacting portion 4B. The slider portion 4A of the slider member 4 is slidably received in a groove (not shown) formed on the frame portion 2A. The elastic member 5 is inserted into a groove 4E formed on one surface of the slider portion 4A.

The elastic member 5 has one end brought into press contact with the slider member 4 and the other end brought into press contact with an inner surface of the frame portion 2C. Therefore, the slider member 4 is continuously urged by the elastic member 5 in the ejecting direction in which the card 11 is ejected from the connector 1.

The cam follower 6 is formed in a bar-like shape and is disposed in a cut portion 2D formed on an outer surface of the frame portion 2A to be rotatable by a predetermined angle. The cam follower 6 has a hole 6A formed at its base portion and fitted over a shaft 2E formed on the frame portion 2A. The cam follower 6 has a guide pin portion 6B formed at its end by bending. The guide pin portion 6B is engaged with a cam groove of the heart cam 4C through a hole (not shown) formed in the frame portion 2A.

The card 11 is inserted into and ejected from the connector 1 in the following manner. At first, the card 11 is partly inserted into the connector 1 in a free state. The guide pin portion 6B is located at a start point of the heart cam 4C. Next, the card 11 is pushed inward into the connector 1. The forward end of the card 11 is brought into contact with the card contacting portion 4B of the slider member 4. As a consequence, the card 11 and the slider member 4 are integrally moved into the connector 1 against a compressive force of the elastic member 5.

Subsequently, the card 11 is pushed to a maximum stroke. Thereafter, pushing is stopped. Then, the card 11 and the slider member 4 are slightly returned back by a restoring force of the elastic member 5. The guide pin portion 6B enters into a recessed portion of a heart-like shape of the heart cam 4C. Thus, a fitting operation of the card 11 is completed.

Again, the card 11 is pushed to the maximum stroke. Then, pushing is stopped. The guide pin portion 6B escapes from the recessed portion of the heart-like shape of the heart cam 4C and returns to a terminal point, i.e., the start point through a guide portion parallel to a sliding direction of the slider member 4. In this case, the slider member 4 performs an ejecting operation of the card 11 by the restoring force of the elastic member 5.

Figure 2:
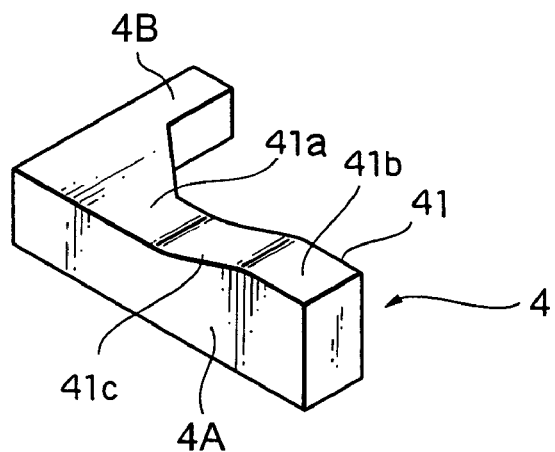
FIG. 2 is a perspective view of a slider member of the card connector illustrated in FIG. 1.

The connector 1 described in conjunction with FIG. 12 may be provided with the braking mechanism described in conjunction with FIGS. 1 through 3. As a result, a card connector similar in function with the connector illustrated in FIGS. 1 through 3 is obtained.

Likewise, the connector 1 described in conjunction with FIG. 12 may be provided with the braking mechanism described in conjunction with FIGS. 7 through 11. In this case, a card connector similar in function to the connector illustrated in FIGS. 7 through 11 is obtained.

The card connectors mentioned above are suitably mounted to a notebook-type personal computer or a portable terminal to connect a small-sized card such as a memory card.

While this invention has thus far been described in connection with the preferred embodiments thereof, it will be readily possible for those skilled in the art to put this invention into practice in various other manners without departing from the scope set forth in the appended claims.

What is claimed is:

1. A card connector comprising:
  a fixed portion adapted to receive a card;
  at least one conductive contact coupled to the fixed portion and adapted to be connected to the card;
  an eject mechanism coupled to the fixed portion and adapted to eject the card from the fixed portion in an ejecting direction; and
  a braking mechanism which is coupled to the eject mechanism and which applies a controlled braking force to the eject mechanism, such that the controlled braking force is weaker later in an ejecting process of the card than in a beginning of the ejecting process of the card;

wherein the eject mechanism comprises:
a slider member movable in the ejecting direction together with the card; and
an elastic member which continuously urges the slider member in the ejecting direction;
wherein the braking member applies the braking force to the slider member, and the braking mechanism comprises:
a cam surface provided to the slider member; and
a pressing member which is connected to the fixed portion and which applies a pressing force elastically against the cam surface.

2. The card connector according to claim 1, wherein the slider member is slidable along the ejecting direction, and the cam surface has a shape such that the pressing force is varied following sliding of the slider member.

3. The card connector according to claim 1, wherein the slider member is slidable between a first position where the card is connected to the contact and a second position where the card is moved from the first position in the ejecting direction; and
wherein the cam surface comprises a first surface for keeping the pressing force at a relatively large value when the slider member is located at the first position, and a second surface for keeping the pressing force at a relatively small value when the slider member is located at the second position.

4. The card connector according to claim 3, wherein the pressing member comprises an elastic leaf spring element which extends from the fixed portion and which includes an extending end that is brought into contact with the cam surface.

5. The card connector according to claim 4, wherein the cam surface comprises an inclined surface connecting the first and the second surfaces to each other.

6. The card connector according to claim 4, wherein the fixed portion comprises:
an insulator holding the contact; and
a cover member coupled to the insulator; and wherein the pressing member includes a first end that is connected to the cover member, and the extending end of the elastic leaf spring element is a free end that is kept in contact with the cam surface.

7. A card connector comprising:
a fixed portion adapted to receive a card;
at least one conductive contact coupled to the fixed portion and adapted to be connected to the card;
an eject mechanism coupled to the fixed portion and adapted to eject the card from the fixed portion in an ejecting direction; and
a braking mechanism which is coupled to the eject mechanism and which applies a controlled braking force to the eject mechanism, such that the controlled braking force is weaker later in an ejecting process of the card than in a beginning of the ejecting process of the card;
wherein the eject mechanism comprises:
a slider member movable in the ejecting direction together with the card; and
an elastic member which continuously urges the slider member in the ejecting direction; and wherein the braking mechanism applies the braking force to the slider member, and the braking mechanism includes:
a contacting portion which is connected to the fixed portion and which comprises a cam surface; and
a pressing member which is connected to the slider member and which applies a pressing force elastically against the cam surface.

8. The card connector according to claim 7, wherein the fixed portion comprises:
an insulator holding the contact; and
a cover member coupled to the insulator; and
wherein the contacting portion is integrally connected to the cover member.

9. The card connector according to claim 7, wherein the slider member is slidable in the ejecting direction, and the cam surface is inclined with respect to the ejecting direction.

10. The card connector according to claim 7, wherein the slider member is slidable between a first position where the card is connected to the contact and a second position where the card is moved from the first position in the ejecting direction; and
wherein the cam surface is inclined in a direction such that the pressing force is kept at a relatively large value when the slider member is located at the first position and such that the pressing force is kept at a relatively small value when the slider member is located at the second position.

11. The card connector according to claim 10, wherein the pressing member comprises an elastic leaf spring element which extends from the slider member and which includes an extending end that is brought into contact with the cam surface.

12. A card connector comprising:
a fixed portion adapted to receive a card;
at least one conductive contact coupled to the fixed portion and adapted to be connected to the card;
an eject mechanism coupled to the fixed portion and adapted to eject the card from the fixed portion in an ejecting direction; and
a braking mechanism which is coupled to the eject mechanism and which applies a controlled braking force to the eject mechanism, such that the controlled braking force is weaker later in an ejecting process of the card than in a beginning of the ejecting process of the card;
wherein the eject mechanism comprises:
a slider member movable in the ejecting direction together with the card; and
an elastic member which continuously urges the slider member in the ejecting direction;
wherein the braking mechanism applies the braking force to the slider member; and
wherein the slider member comprises a heart cam, and the eject mechanism further comprises a cam follower guided by the heart cam to move following movement of the slider member.

* * * * *